US009241033B2

(12) United States Patent
Guntupalli et al.

(10) Patent No.: US 9,241,033 B2
(45) Date of Patent: Jan. 19, 2016

(54) MANAGED PEER-TO-PEER FILE SHARING

(75) Inventors: Anil Guntupalli, Waltham, MA (US);
Raul I. Aldrey, Brookline, MA (US);
Edwin Elberg, Woburn, MA (US);
Nosherwan Minwalla, Irving, TX (US);
Shadman Zafar, Coppell, TX (US);
Luis R. Blando, Woburn, MA (US);
Shafiq Kassam, Lewisville, TX (US);
Liwen Yang, Burlington, MA (US);
Aung Tun, Flower Mound, TX (US);
Diego J. Crespo, Boston, MA (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 876 days.

(21) Appl. No.: 12/688,349

(22) Filed: Jan. 15, 2010

(65) Prior Publication Data
US 2010/0121934 A1 May 13, 2010

Related U.S. Application Data

(63) Continuation of application No. 11/049,561, filed on Feb. 2, 2005, now Pat. No. 7,664,861.

(51) Int. Cl.
*G06F 15/16* (2006.01)
*H04L 29/08* (2006.01)
*H04L 12/18* (2006.01)

(52) U.S. Cl.
CPC .......... *H04L 67/104* (2013.01); *H04L 12/1818* (2013.01); *H04L 67/108* (2013.01); *H04L 67/1053* (2013.01); *H04L 67/14* (2013.01); *H04L 67/142* (2013.01)

(58) Field of Classification Search
USPC .......................................... 709/227, 207, 228
See application file for complete search history.

(56) References Cited

U.S. PATENT DOCUMENTS

| 6,425,000 | B1* | 7/2002 | Carmello et al. ............. 709/217 |
| 6,938,042 | B2* | 8/2005 | Aboulhosn et al. |
| 7,047,406 | B2* | 5/2006 | Schleicher et al. ........... 713/168 |
| 2004/0264471 | A1* | 12/2004 | Boulay et al. ............... 370/395.2 |
| 2005/0195799 | A1* | 9/2005 | Burne et al. .................... 370/352 |
| 2005/0213603 | A1* | 9/2005 | Karighattam et al. ........ 370/463 |
| 2006/0111083 | A1* | 5/2006 | Goss .......................... 455/412.1 |
| 2008/0052783 | A1* | 2/2008 | Levy ............................... 726/26 |

* cited by examiner

*Primary Examiner* — Ranodhi Serrao
*Assistant Examiner* — Thomas Richardson

(57) ABSTRACT

A network server that includes at least a processor is configured to receive, from a first network, a trigger event received in the first network from a non web-enabled device configured to communicate the trigger event to the first network, wherein the trigger event includes a designation of at least one file to be transferred. The network server is further configured to transmit a notification that includes the designation to a second network based on the trigger event, the second network being a web-enabled network communicatively coupled to at least a first web-enabled peer node that is capable of receiving the notification.

20 Claims, 10 Drawing Sheets

MANAGED PEER-TO-PEER FILE SHARING

RELATED APPLICATIONS

This application is a continuation of, and claims priority to, co-pending U.S. patent application Ser. No. 11/049,561, filed on Feb. 2, 2005, the contents of which are hereby incorporated by reference in its entirety.

FIELD

The systems and methods relate to peer-to-peer file sharing, and more particularly to a file sharing platform for integrating peer-to-peer file sharing and Public Switched Telephone Network technology.

BACKGROUND

Current means to share files include emails and ftp/http posting. These means can require the file that is being shared to be hosted on a server. Hosting can be expensive and such systems can limit the size of files. In addition, the transfer speeds available for these systems can result in long delays when sharing large files. Peer-to-peer (p2p) file sharing solutions have been introduced, particularly in music and video sharing environments. Common p2p solutions can provide anonymous search capabilities and retrieval of files. Without proper management of shared files, these solutions can unknowingly allow for illegal distribution of protected content. Managed p2p solutions are generally limited to intranet environments and do not readily support file sharing over extranets or the Internet. Additionally, there is no known p2p file sharing solution that can provide ease of file sharing for traditional phone users and the proliferating cell phone and conference calling markets.

SUMMARY

A system for providing managed peer-to-peer file sharing can include peer nodes having a web browser and a p2p agent. The web browser can connect to the Internet and can interface with the p2p agent. The p2p agent provides the file sharing utilities for implementing the p2p network. A web server connected to the Internet can monitor and manage p2p activity, including providing persistent storage for the p2p networks. The web server can interface with a Public Switched Telephone Network (PSTN) to provide access to the p2p network for PSTN peer nodes that do not have web browsing capabilities. A method of implementing managed p2p file sharing includes registering users; providing login and logout functions; creating p2p sessions; preparing, forwarding, receiving, accepting and/or rejecting invitations to join p2p sessions; quitting p2p sessions; deleting p2p sessions or selected members of p2p sessions; and sharing and transferring files.

In one embodiment, a system can provide for p2p file sharing between a plurality of peer nodes connected to a network. The peer nodes can include application servers in communication with the network and having an interface with a peer node user; services modules in communication with the application servers and having file management tools therein; and p2p utilities in communication with the services modules and having file sharing connections to other peer nodes of the system to form a p2p session. A network server can be connected to the network and in communication with the peer nodes to monitor activity of the p2p session and a database can be in communication with the network server to store a record of the activity.

In one embodiment, a method of sharing a file in a peer-to-peer file sharing session can include breaking the file into blocks; attaching identification data to a first of the blocks; broadcasting the first of the blocks from a broadcasting peer node of the session to other peer nodes of the session; propagating an acknowledgement from one of the other peer nodes when one of the blocks is received at the one of the other peer nodes; awaiting receipt of the acknowledgement at the broadcasting peer node; and iteratively attaching identification to a subsequent block, broadcasting the subsequent block and awaiting receipt of the acknowledgement.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

Figure 1:
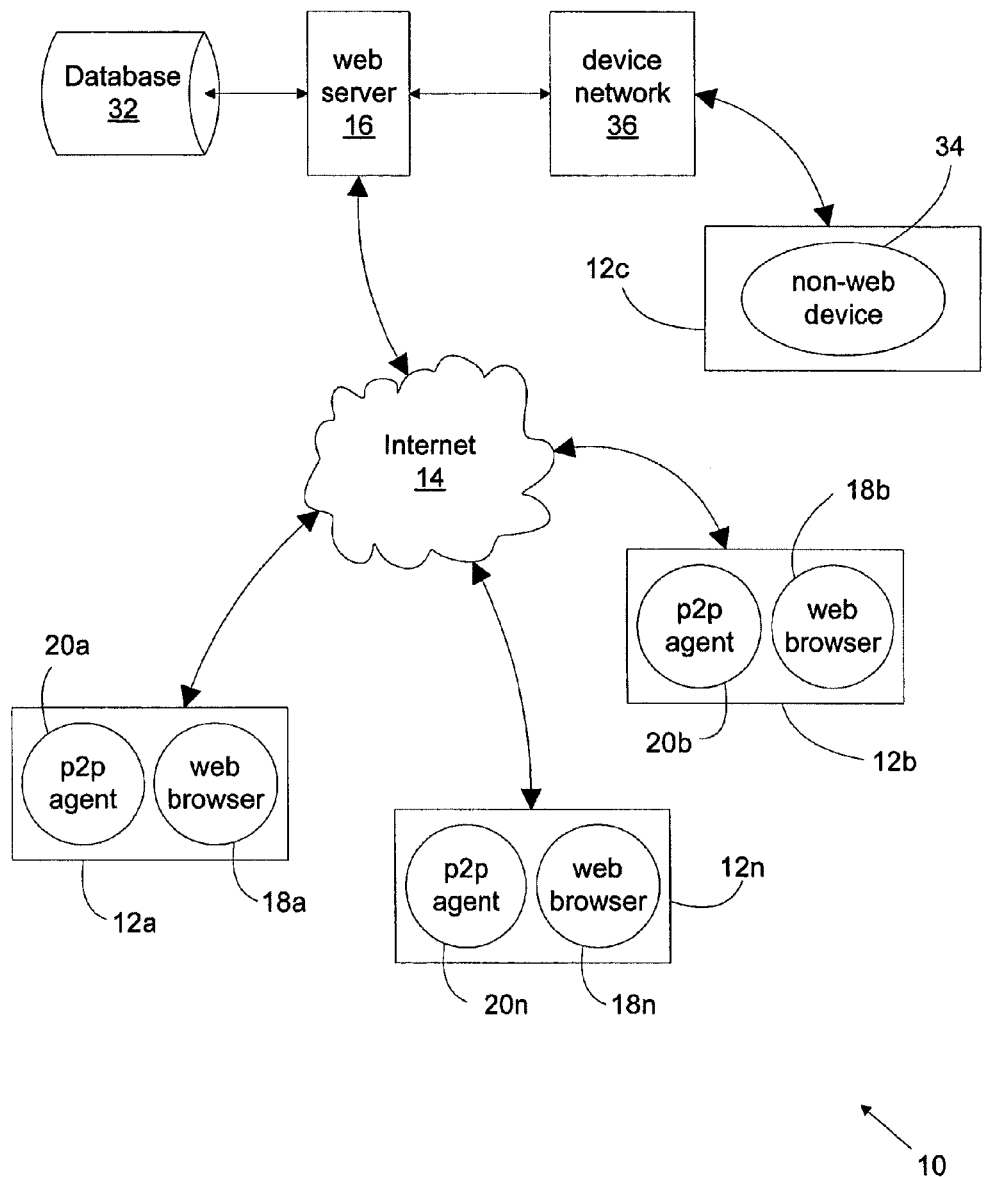
FIG. 1 shows a schematic representation of a system for peer-to-peer file sharing.

Referring to FIG. 1, a system 10 can provide peer-to-peer file sharing (p2p) among a number of p2p nodes 12a-12n over the Internet 14. A web server 16 can manage system 10 operations. Each node 12a-12n can include a browser 18a-18n and a p2p agent 20a-20n. The browsers 18a-18n can serve as user interfaces to the Internet 14 and to the p2p agents 20a-20n. The p2p agents 20a-20n can handle communications between peer nodes.

Figure 2:
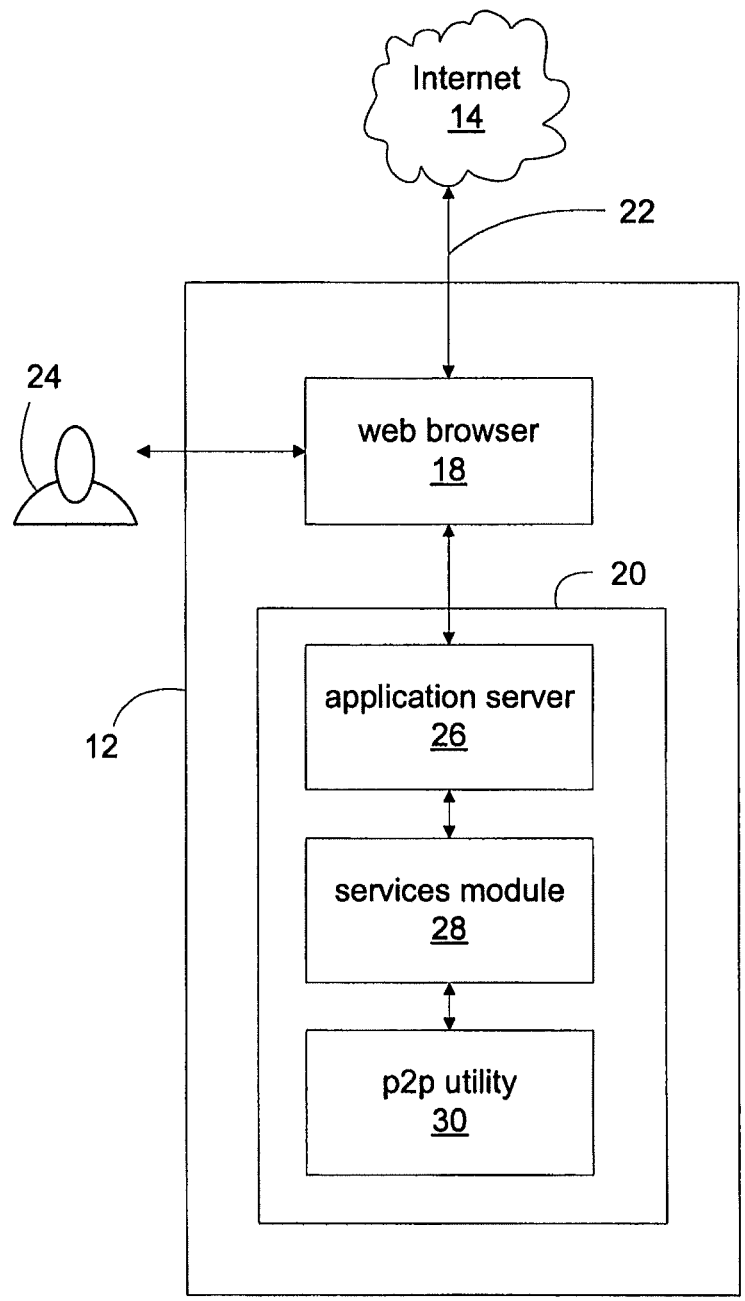
FIG. 2 shows a schematic representation of a peer node of the system of FIG. 1.

FIG. 2 illustrates a peer node 12. Web browser 18 can connect to the Internet 14 through connection 22, as is known in the art. As previously noted, web browser 18 can provide the interface between a user 24 and the Internet 14 and the p2p agent 20. Web browser 18 communicates with p2p agent 20 via application server 26 of p2p agent 20. Application server 26 can provide the administrative functions for p2p agent 20, including user registration, login and logout, and interfaces for creating, deleting joining and quitting peer groups and other functions as will be described in further detail below.

The application server 26 in turn communicates with services module 28. Services module 28 can provide the basic tools required for sharing files in the p2p environment. For example, services module 28 can include tools or services for indexing and searching files, for monitoring and reporting p2p activity to web server 16, and other tools to be described further. At a core level, p2p 20 can include a p2p utility 30 to provide basic features of the p2p system. These basic features can include communication between peer nodes 12a-12n, creating and deleting peer groups, advertising peer groups to potential members, peer discovery and joining and quitting peer groups. The p2p utility 30 can include known p2p platforms that can be configured for operation with services module 28 and application server 26 of p2p node 12. For example, JXTA technology by Sun Microsystems, Inc. of Santa Clara, Calif. is a set of open protocols that can allow connected device on a network to communicate and collaborate in a p2p manner.

Figure 3:
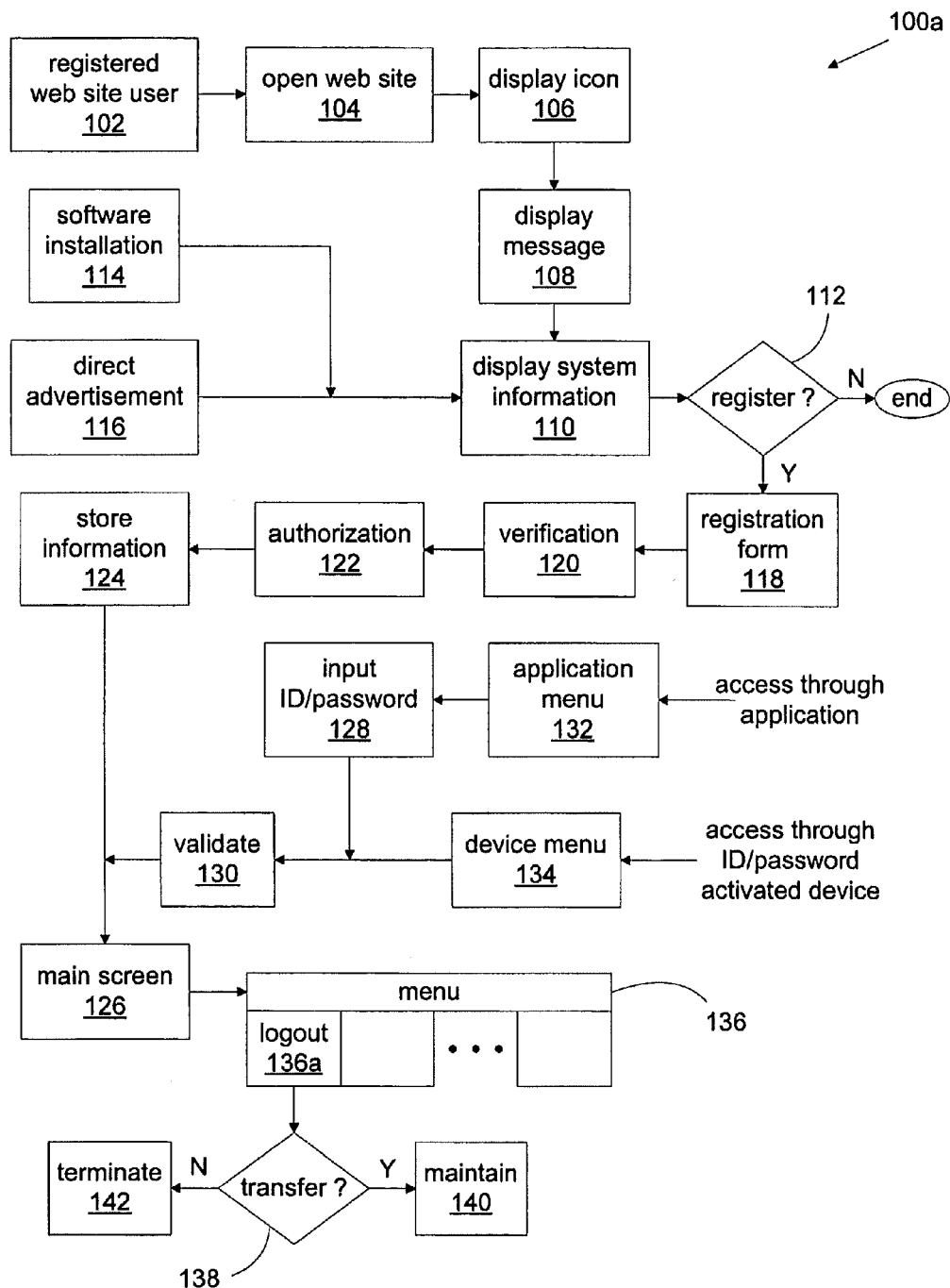
FIG. 3 is a schematic flow diagram of a registration, login and logout procedure for the system of FIG. 1.

Referring now to FIGS. 3-8, there are shown schematic flow diagrams for a method 100 implementing the functionality of system 10. FIG. 3 shows a flow diagram for a portion 100a of method 100, which provides user registration, login and logout functions for system 10. A user can be directed to register with system 10 from a number of paths. FIG. 3 illustrates three scenarios, though others can be accommodated. In a first scenario, 102, the user can be a registered user of a website platform that supports the use of system 10. When the user opens the website, as at 104, an icon for accessing system 10 can be displayed (106). As may be customary in the art, the icon can be grayed to indicate that the user has not previously registered to use system 10. When the cursor is placed or clicked on the icon, a message can be displayed (108) asking if the user desires additional information regarding system 10. By clicking on a link or icon in the message, the user can be directed to a site and presented (110) with the system 10 information, which can present the user with a choice (112) of registering with system 10.

In a second scenario 114, the user may be installing software that supports the use of system 10. The installation procedure may include an advertisement for system 10, which can present the user with system 10 information, as at 110. In a third scenario 116, the user can receive a direct advertisement for, or invitation to join, system 10. Again, the user may link to a site providing the system 10 information, as at 110. If, at 112, the user chooses to register, a registration form can be displayed (118) for the user to enter personal identification, billing information, security information and other system 10 data. The data can be provided to web server 16 for verification (120) and once verified, the user can be authorized (122) to use system 10. The registration information can be stored (124) at a central database 32, as shown in FIG. 1. Once registration is complete, the user can be directed to a main screen (126) for interfacing with system 10.

The security information input during registration can include a user ID and a password. Previously registered users can input (128) the user ID and password at a login screen so as to gain access to the main screen, as at 126. The ID and password can be validated against the security information in database 32, as at 130, with access provided for validated users. Access to the login screen may typically be gained by choosing a menu item (132) from within an application supporting the use of system 10.

It can be understood that the login screen can be accessed from a variety of devices, or peer nodes 12, including personal computers, wireless web browsers, such as personal digital assistants and cell phones and Public Switched Telephone Network (PSTN) devices. In some instances, activation of the device may include input of a device ID and password, such that the main screen for system 10 can be accessed by choosing a menu item, as indicated at 134. The device ID and password can be validated against database 32, as previously described.

Once the user has accessed the main screen, as at 126, a menu can be presented to the user, as at 136, which can include various actions the user may choose. If the user chooses to logout of system 10 (136a), the user can be presented with a choice, at 138, to continue or terminate ongoing transfers. If the user chooses to continue transfers, the transfer connections are maintained (140) until ongoing transfers are complete. Otherwise, connections to other peer nodes are terminated, as at 142.

In addition to the password and security information described above, the method 100 can include additional security measures for communication privacy, authentication of peers and message integrity. Method 100 can adopt known security protocols, e.g., Transport Layer Security (TLS) handshake and record protocols, that can provide a basis for the method 100 security procedures. Such protocols can support security measures including authentication certificates, encryption, decryption and public and private key systems, which can be utilized by method 100. The certificates and private keys can be provided to a user upon registration Creation of p2p sessions, joining p2p sessions and file transfers, as described further below, can include certificate distribution and authentication, as well as the use of known public/private key systems for file encryption/decryption.

Figure 4:
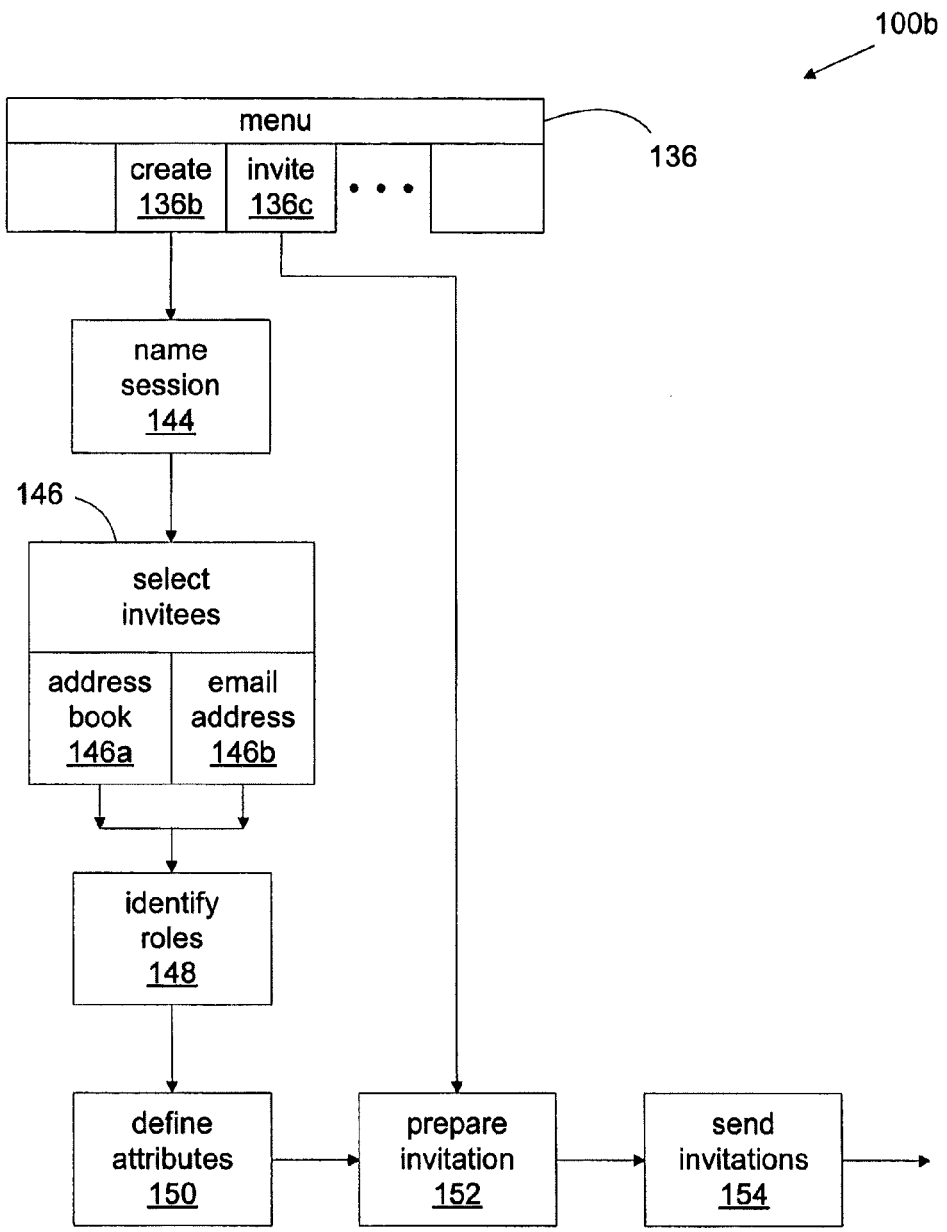
FIG. 4 is a schematic flow diagram of a method of creating a peer-to-peer file sharing session.

FIG. 4 shows a flow diagram for a portion 100b of method 100 when the user chooses to create a p2p file sharing session, as at 136b. The user can specify a name for the p2p session, as at 144, and can select invitees to the p2p session, as at 146. To select invitees, the user can choose the invitee from an address book (146a), or the user can type an email address for the invitee (146b). It can be understood that the system 10 and method 100 can be interfaced with known applications that can include address book and email address listings from which the user can choose the invitees.

The user can then define roles for the invitees, as at 148. The roles can be associated with various rights with respect to the p2p session being created. Roles for invitees can include "administrator", "member" and "guest". In the role as the creator of the session, the user's rights can include: add and view file rights; add and delete invitee rights; and delete session rights. By default, the creator can also be the administrator, or the creator can designate one of the invitees to be the administrator. The administrator's rights include: add and view file rights; and add and delete invitee rights. By default, invitees can have member rights, which can include add and view file rights. The user can define a guest role for an invitee, which can include view file rights.

The user can then define properties and/or attributes for the p2p session, as at 150. Attributes can include: locked or unlocked; persisted; sync updates; expiration; cache; priority; notification preferences; and notification medium. A locked session can includes sessions where no other members can be added unless all current members agree to the addition. In an unlocked session, the administrator can add and delete members. The session can be persisted, i.e., the system 10 can maintain duplicates of the objects shared by session members, so as to increase availability when one or more session members no longer participate in the session. The user can choose the server where the persisted objects can be stored, e.g., at web server 16 or at one or more other servers that the user can designate. The amount of cache can be chosen by the user. The user can specify that no new files will be accepted when the cache is exceeded, or that existing files can be overwritten.

The user can also choose to sync updates of member addresses with other applications, including contacts, address books and other applications having member address information. The sync updates can include address changes or additions as new members are added. The session can have an expiration policy as chosen by the creator, which can include a specific end date or time period, an end after a specified period of inactivity, or no end date. The user can specify a priority for the session, which can determine bandwidth availability for the session compared with other sessions. The user can specify the types of notifications to provide to session members, including notifications of new files being shared, new files being downloaded, files being deleted, a member being deleted from a session, or none, some, or all such notifications. The notification medium, e.g., email, or "pop-up" can also be specified.

Figure 5:
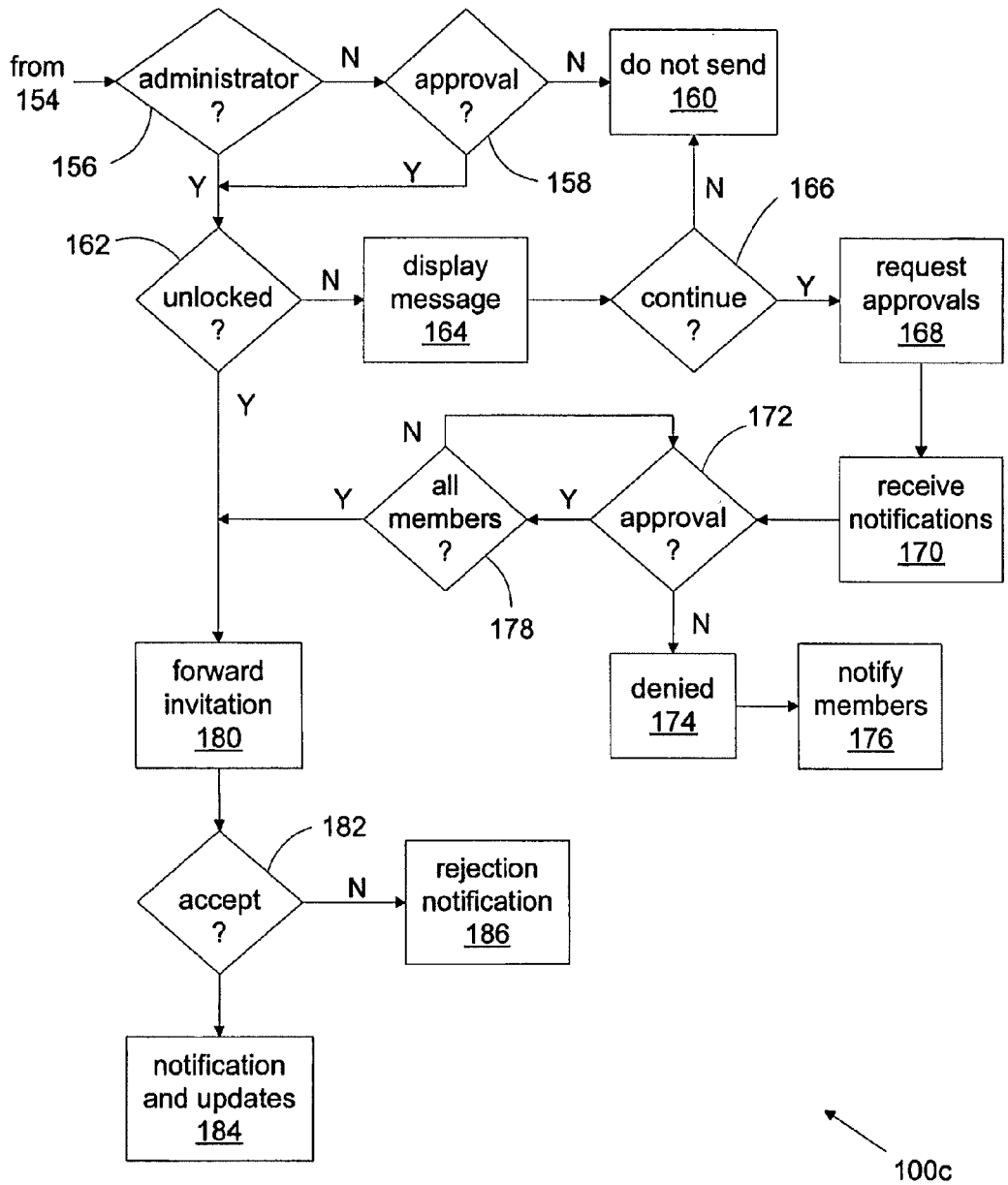
FIG. 5 is a schematic flow diagram of a method of inviting peers to join a peer-to-peer file sharing session.

After assigning attributes, the user can prepare (152) an invitation message to the identified session members, and can send the message (154) to the identified session members to initiate the session. The invitation message can inform the members that a session is open and provide information concerning the subject of the session, including the name of the person sending the invitation and the names of other invitees. It can be understood that members of an existing session can choose to invite new members to join the session, as at 136c. Members of a session can also prepare (152) and send (154) invitations to the selected invitees, as indicated. FIG. 5 illustrates a flow diagram for a portion 100c of method 100 that can implement forwarding, receipt, acceptance and/or rejection of an invitation to join a p2p session.

If the invitation is from other than the administrator of the session, as determined at 156, the administrator's approval is requested, as at 158, by sending a notification to the session administrator. If the administrator's approval is not obtained, the invitation is not sent (160). If the session is locked, as previously described and as determined at 162, a message can be displayed (164) informing the invitation preparer that the session is locked. The preparer can choose (166) to request approval from other members of the session, as at 168, or can choose not to send the invitation (160). If approval is requested, other members of the session can receive a notification (170) that a new invitation is being made and can approve or deny the invitation, as at 172. If one of the members denies the invitation, as at 174, a notification can be sent to other members indicating that the new invitation will not be sent, as at 176.

If all members approve of the request, as determined at 178, or if the session is unlocked as determined at 162, the invitation can be forwarded to the invitee (180). The invitee can accept or reject the invitation, as at 182. If the invitation is accepted, the invitee becomes a member of the session and appropriate notifications and session information updates are provided to other session members, as indicated at 184. If the invitation is rejected, a rejection notification is provided to the other members, as indicated at 186.

Figure 6:
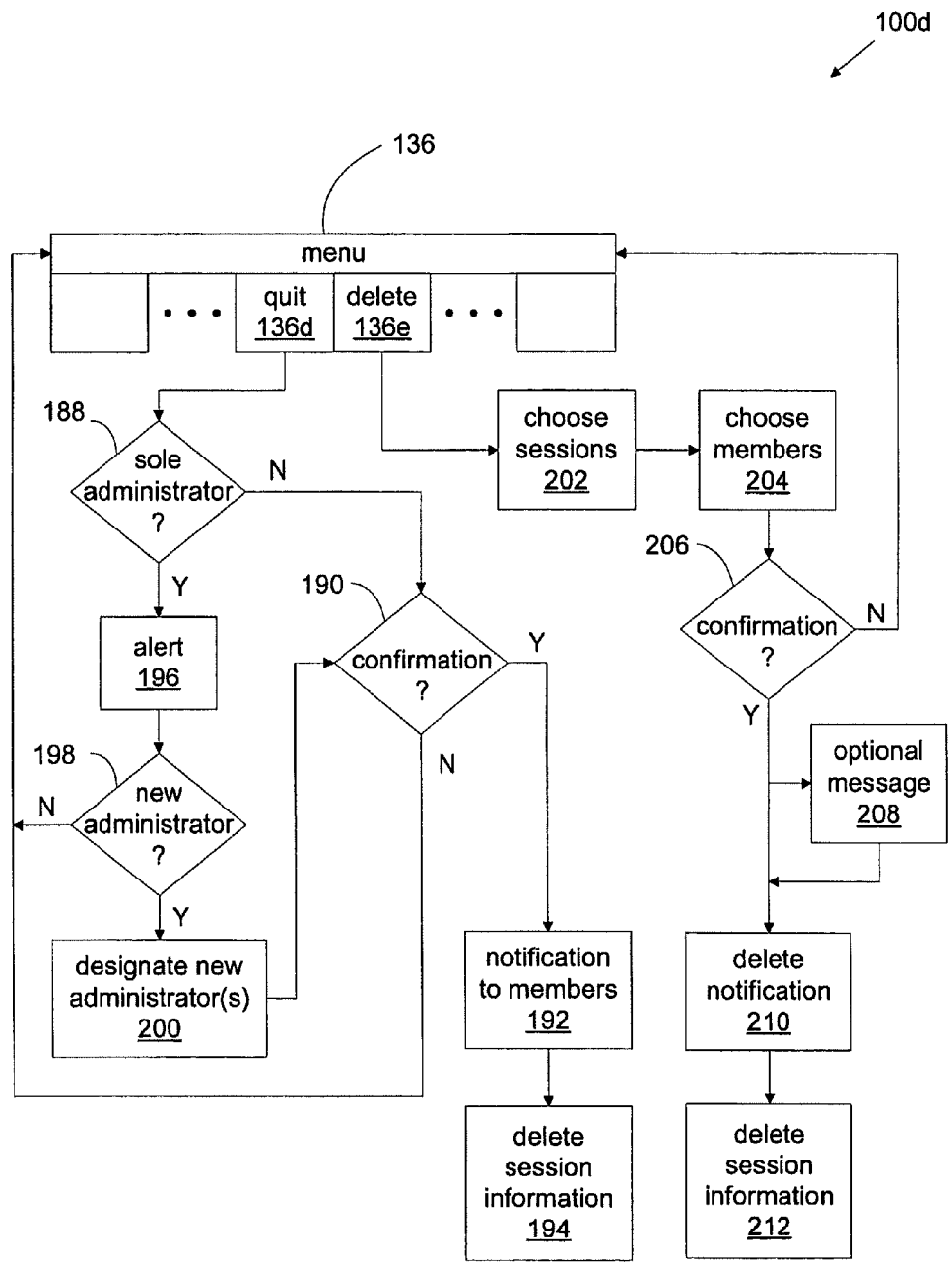
FIG. 6 is a schematic flow diagram of a method of quitting and deleting a peer-to-peer file sharing session.

FIG. 6 shows a flow diagram for a portion 100d of method 100 when the user chooses to quit a peer-to-peer file sharing session, as at 136d, or the creator/administrator chooses to delete a peer-to-peer file sharing session, or to delete one or more members from the p2p session, as at 136e. When quit 136d is chosen, method 100 can determine if the user is the sole administrator for the session, as at 188. If not, the user can receive a message (190) so as to confirm the choice to quit. If the user does not confirm, the user can be returned to the menu (136). If the user confirms, method 100 can send notifications to other session members and update their status information, as at 192. Session information can be deleted (194) from the user's display, such that the user no longer has access to the session.

If the user is the sole administrator for the session, as determined at 188, the user can be given an alert (196) showing that the user is an administrator and providing the user a choice (198) whether or not to designate a new administrator. If the user chooses not to designate a new administrator, the user can be returned to the menu (136). If the user chooses to designate a new administrator, the user can designate (200) one or more, or all, of the members of the session. After designating the new administrator(s), the confirmation message can be displayed, as at 190. The notifications to other members (192) can include the new administrator designations.

With regard to choosing delete 136e, the roles of the members of the p2p session, as described previously, can limit session and member deletion rights to the creator and/or administrator of a session. Thus, menu item 136e can be available only for members having deletion rights. When delete 136e is chosen, the user can choose the p2p session (or sessions) where the user desires to make deletions from among those that the user has deletion rights to, as at 202. Once the session is chosen, the user can chose (204) to delete one or more members from the session, or to delete the entire session by choosing all the members, as at 204. The user can receive a message (206) so as to confirm the deletion choices made.

If the user does not confirm, the user can be returned to the menu 136. If confirmed, the user optionally can compose a message (208) to indicate the reasons for the deletion. The method 100 can send notifications to other session members, as at 210, indicating the deletion action taken and including any optional messages. The session information can be deleted (212) from the deleted member's displays, such that access to the session is not available for deleted members. Deletion of a session can be compared to deleting all members of the session. Thus, when a session is deleted, session information is deleted for all members.

Figure 7:
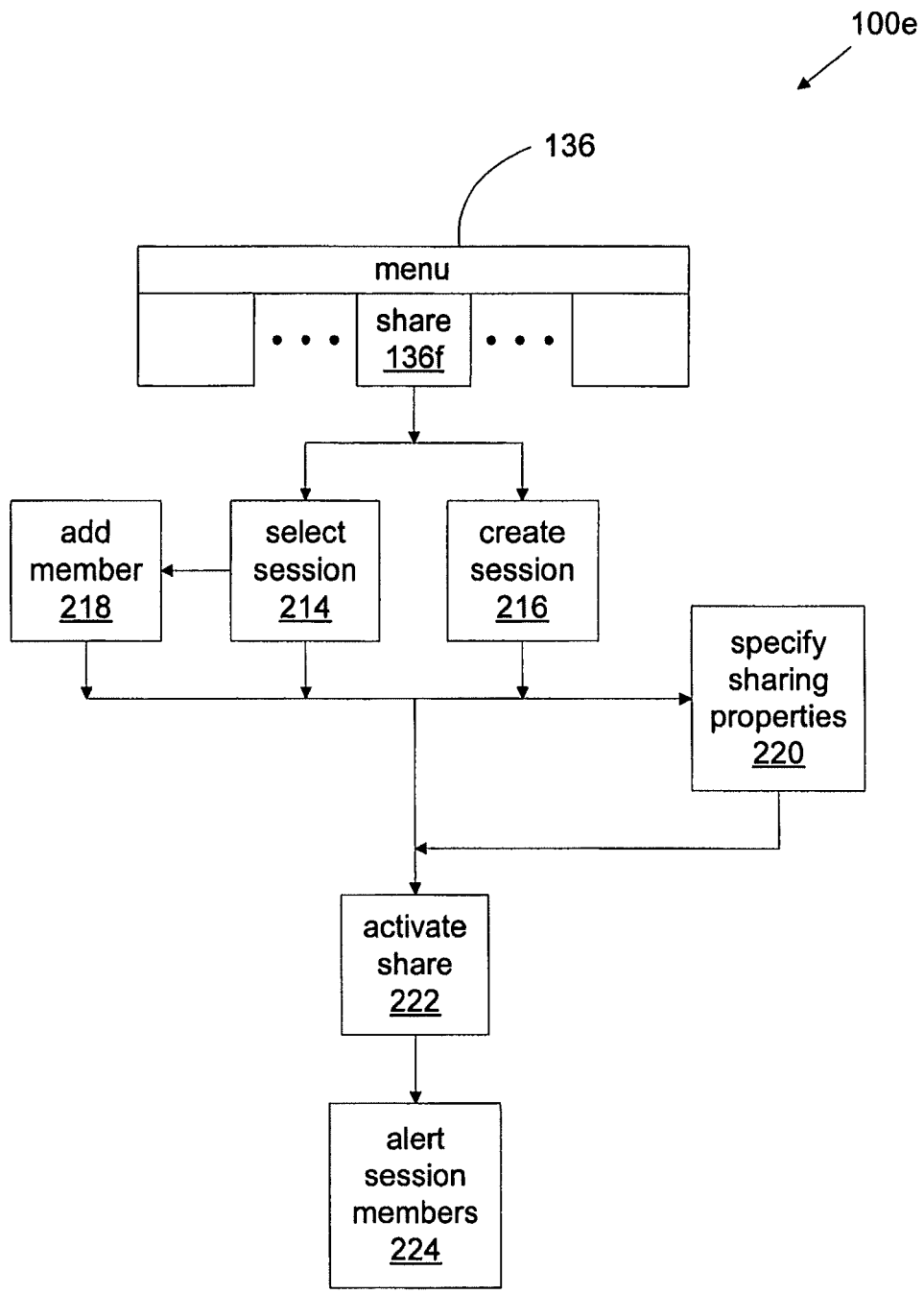
FIG. 7 is a schematic flow diagram of a method of sharing files during a peer-to-peer file sharing session.

FIG. 7 shows a schematic flow diagram of a portion 100e of method 100 of sharing files during a peer-to-peer file sharing session. From a menu, the user can choose to "share" a file, e.g., share 136f can be selected from menu 136. It can be understood that method 100 can be integrated with other applications that the user may be executing, such that "share" can be part of a pull down menu or button icon within the applications. For example in a word processing application, "share" can be one optional choice when a "file" icon is clicked or "file" is chosen from a menu.

After selecting share (136f), the user can select the p2p session where the file can be shared, as at 214. Optionally, the user can create a new p2p session for sharing the file (216), or add new members to an existing session (218). The user can also optionally specify (220) the sharing properties for the file to be shared, including scheduling a time for download and choosing the persistence attributes. If sharing properties are not specified, the default properties, or attributes, for the p2p session can be used. The user can activates the "share" (222), e.g., by clicking on a "share" button. Method 100 can provide an alert (224) to session members to indicate that the file can be shared. The alert can include an invitation to join the session, if a new session was created for sharing the file, or if new members were added to the session.

In addition to those described above, method 100 can include menu items for p2p session management, including password changes, file management (e.g., move, copy, delete and/or sort), create folders, personal preferences changes, or combinations thereof. Also as described above, method 100 can provide a user with messages and/or alerts regarding p2p sessions, including invitations to sessions, new files available for sharing, acceptance or rejection of invitations and deletions of members and/or sessions. In addition, method 100 can provide alerts to notify users when a file is downloaded, when a file the user wishes to delete is a shared file, when a newer version is available for a shared file the user wishes to open and other file or p2p session management alerts, such as an alert when the p2p session exceeds maximum allocated persistent space.

The alerts can be provided in a variety of formats, depending on the device through which the user connects to system 10. For example, alerts can include pop-ups, such as may be known in appointment scheduling applications, new windows in web browser 18, email messages, voice mail messages, short message service messages for the user's cell phone, personal digital assistant or pager, and/or combinations of some or all the above.

For users of devices, such as PSTN devices, that do not include web browsing capabilities, as can be exemplified by peer node 12c having a non-web device 34 in FIG. 1, the device network 36 can connect to web server 16. A user of device 34 can have limited access to system 10 and the functionalities provided by method 100. For example, method 100 can provide for such a user to check and respond to alerts, but other functionality, such as file downloads, can be limited. For example, device network 36 can receive an alert from web server 16 for user of peer node 12c to join a p2p session. The alert can trigger device network 36 to prepare a voice mail message for peer node 12c, connect to the PSTN and deliver the voice mail message to peer node 12c.

In one embodiment, system 10 can provide for PSTN events to trigger p2p activity. For example, an incoming call from a known party to device network 36 can trigger a share between two peers. The PSTN trigger can be considered as a signal for the p2p activity to begin and is effectively out of band in that the p2p activity can occur separately from the PSTN. This action can be extrapolated to multi-party conference calls.

Figure 8:
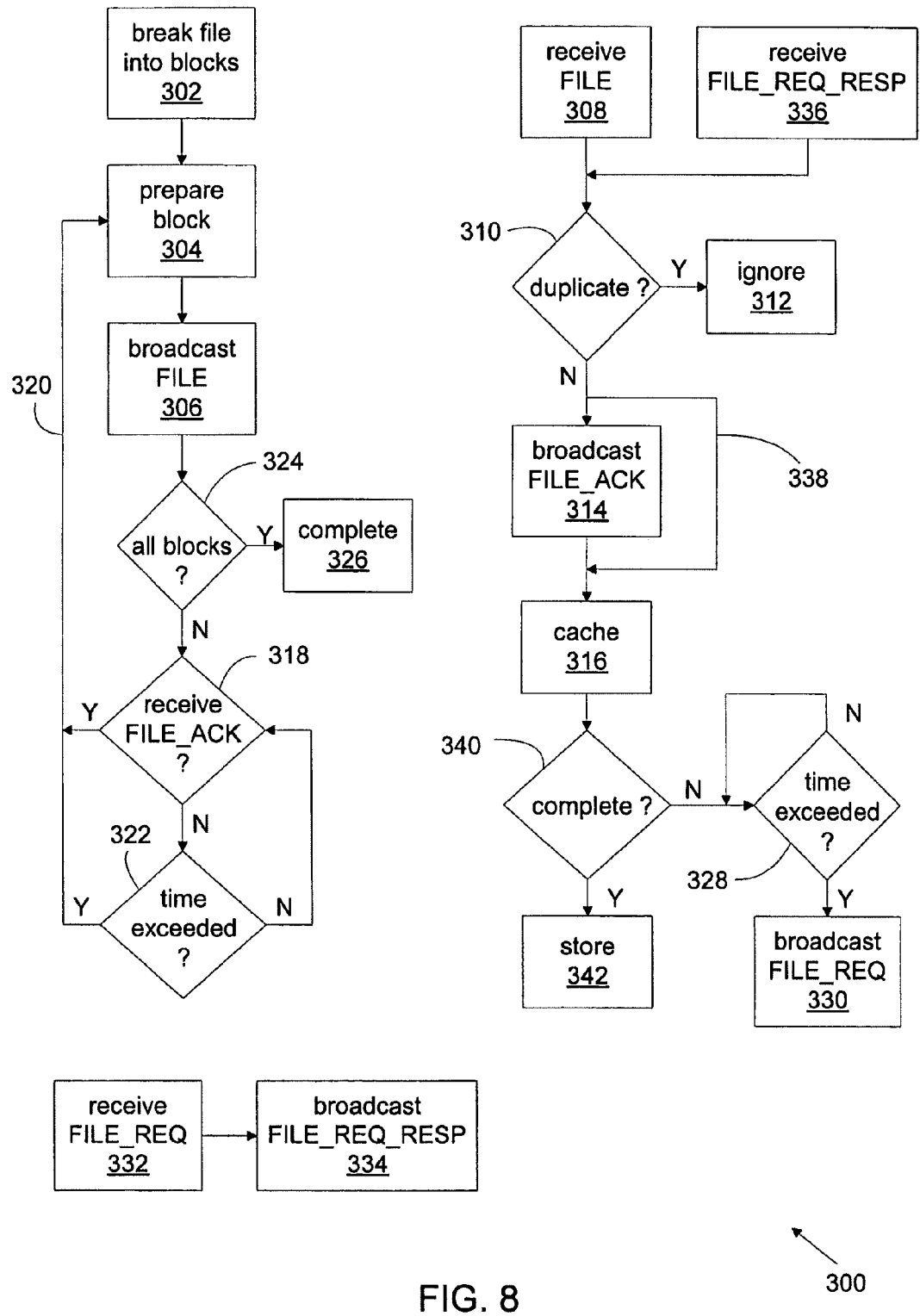
FIG. 8 is a schematic flow diagram of a messaging protocol for sharing files.

In order to provide efficient file transfer, or sharing, among peers, the method 100 can include a messaging protocol 300, as shown in FIG. 8. Protocol 300 can break the file into blocks, as at 302, and can forward a message for each block. The messages can include one block of file data and information about the file and block being transferred. A FILE message containing the first block of data can be prepared (304) and broadcast (306) to the members of the p2p session. When a member receives a FILE message (308), protocol 300 can check to see if the FILE message is a duplicate (310) and, if so, the FILE message can be ignored (312). If the FILE message is not a duplicate, a FILE-ACK message, including the file and block information, can be broadcast back (314). The received FILE message can be cached (316) to await receipt of the complete file.

When the member broadcasting the file receives the FILE-ACK message, as at 318, a new FILE message containing the next block can be prepared (304) and broadcast (306), as indicated by return loop 320. Since web broadcasting and acknowledgement can depend on connection speeds between members, time delays between sending a FILE message and receiving a FILE_ACK message can be considerable. To limit such delays, protocol 300 can determine (322) if a specified time has been exceeded, without receiving a FILE_ACK message. If the time is exceeded, protocol 300 can enter return loop 320. If the time is not exceeded, protocol 300 continues to wait for the FILE_ACK message, e.g., by returning to 318.

When all blocks are broadcast, as determined at 324, a file download complete message can be broadcast (326).

Due to the varying transmission speeds that can be experienced with web connections, a member can receive blocks out of order, or can miss receiving one or more blocks. Since the FILE messages can include block information, the blocks can be cached in their proper order. For missing blocks, protocol 300 can await receipt of a new block for a specified time, as determined at 328. The time can be a set delay, or can be based on the average time between received blocks. If no new block has been received within the specified time, the member can broadcast (330) a FILE_REQ message.

The FILE_REQ message can be broadcast to the member broadcasting the file, or can be sent to all members. When a FILE_REQ message is received, as at 332, the block can be sent to the requesting member in a FILE_REQ_RESP message, as at 334. The receipt of a FILE_REQ_RESP message (336) can be handled in the manner of receipt of a FILE message, except that a FILE_ACK message need not be broadcast, as indicated by path 338. It can also be understood that the FILE_ACK messages broadcast at 314 can be received by all members. Thus, members can be aware of which members have received various blocks and the FILE_REQ messages can be sent to specific members known to who have received the block. When all blocks have been received, as determined at 340, the file blocks can be stored from cache (342).

Figure 9:
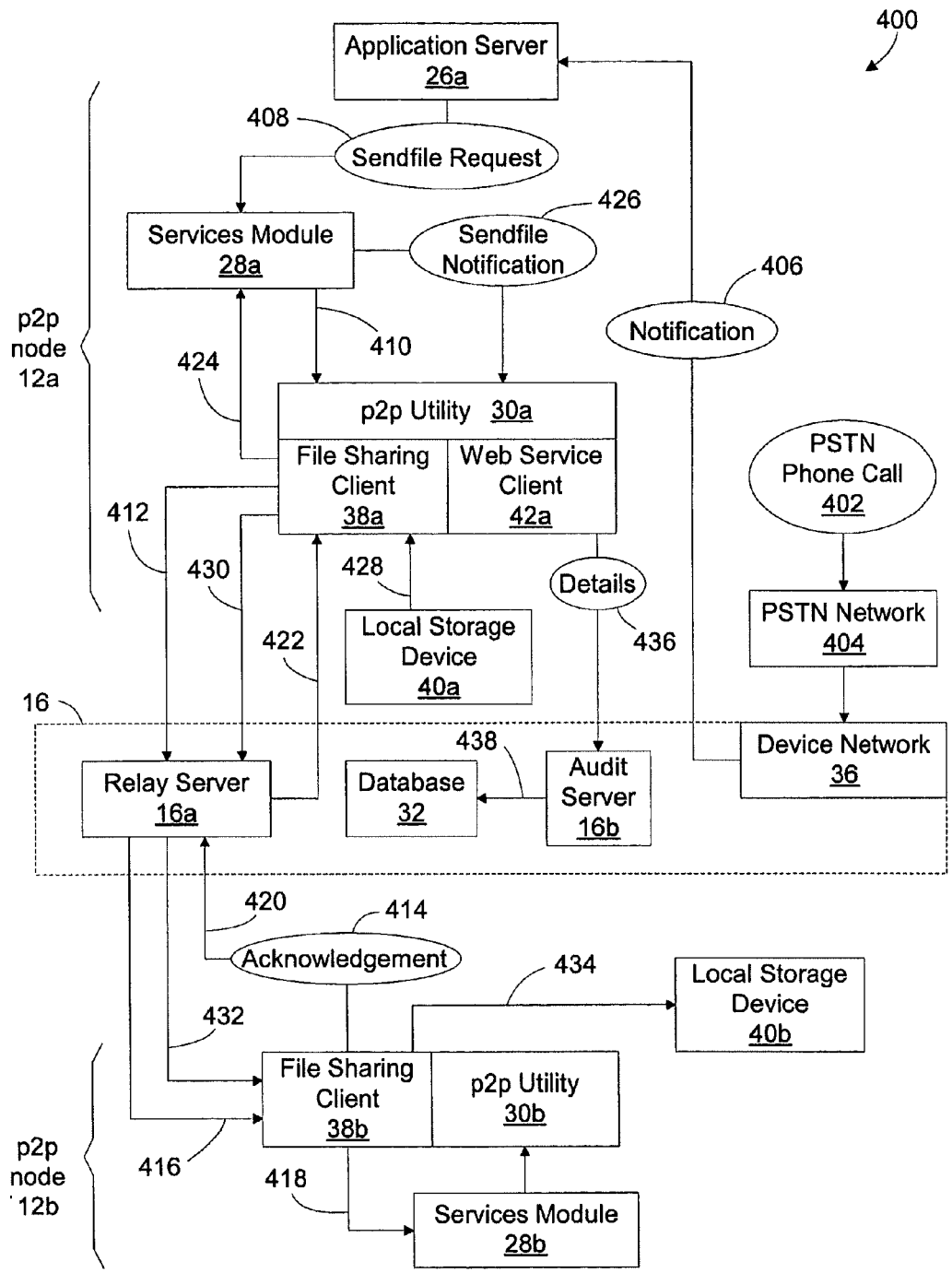
FIG. 9 is a schematic data flow diagram of an exemplary peer-to-peer file sharing session.

Referring now to FIG. 9, there is shown a schematic data flow diagram of an exemplary peer-to-peer file sharing session 400 for which a PSTN event triggers p2p activity between p2p node 12a and p2p node 12b. For the exemplary session 400 of FIG. 9, a user can initiate a PSTN phone call (402), e.g., from a p2p node 12c. For the exemplary session of FIG. 9, p2p node 12c can include functionality necessary to designate a file download. The call can be routed through PSTN network 404 to device network 36.

Device network 36 can serve as the web interface for p2p node 12c and can provide a notification 406 to p2p agent 20a of p2p node 12a via web server 16 and web browser 18a of p2p node 12a. Based on phone call 402 designating a file for transfer, p2p agent 20a can forward a sendfile request 408 to p2p node 12b via web server 16. For the exemplary data flow configuration of FIG. 9, the data flow from phone call 402 to p2p agent 20a can be illustrated by application server 26a of p2p agent 20a receiving notification 406 and initiating sendfile request 408 to services module 28a, which in turn can forward the request to p2p utility 30a, as indicated by arrow 410. File sharing client 38a of p2p utility 30a can forward sendfile request 408 to relay server 16a of web server 16, as indicated by arrow 412.

When sendfile request 408 is received at p2p node 12b, p2p agent 20b can provide acknowledgement 414 to p2p node 12a, indicating p2p node 12b is ready to receive the file to be transferred. For the exemplary data flow configuration of FIG. 9, file sharing client 38b of p2p utility 30b can receive sendfile request 408, as indicated by arrow 416, which can be forwarded to services module 28b, as indicated by arrow 418, for processing. Upon receipt of the processed sendfile request, the p2p utility 30a, can respond by forwarding acknowledgement 414 to file sharing client 38b. Acknowledgement 414 can be forwarded to p2p node 12a via file sharing server 16a, as indicated by arrows 420, 422.

Upon receipt of acknowledgement 414, p2p agent 20a can prepare the file for transfer. For the exemplary data flow configuration of FIG. 9, file sharing client 38a can receive acknowledgement 414 and forward acknowledgement 414 to services module 28a, as indicated by arrow 424. Services module 28a can provide a sendfile notification 426 to p2p utility 30a. File sharing client 32a can obtain or read the file from local storage device 40a, as at arrow 428, and initiate file transfer to p2p node 12b, via file sharing server 16a, as indicated by arrows 430, 432. File sharing client 38b can receive the file transfer and write the file to local storage device 40b, as indicated by arrow 434. In addition, web service client 42a of p2p utility 30a can provide file sharing details 436 to audit server 16b of web server 16 for storage in database 32, as at arrow 438. The file sharing details can include p2p node sender/receiver identification, initiation identification, information on file name, file size, beginning and ending times of transfer, and other details for identifying the file and providing billing data.

Figure 10:
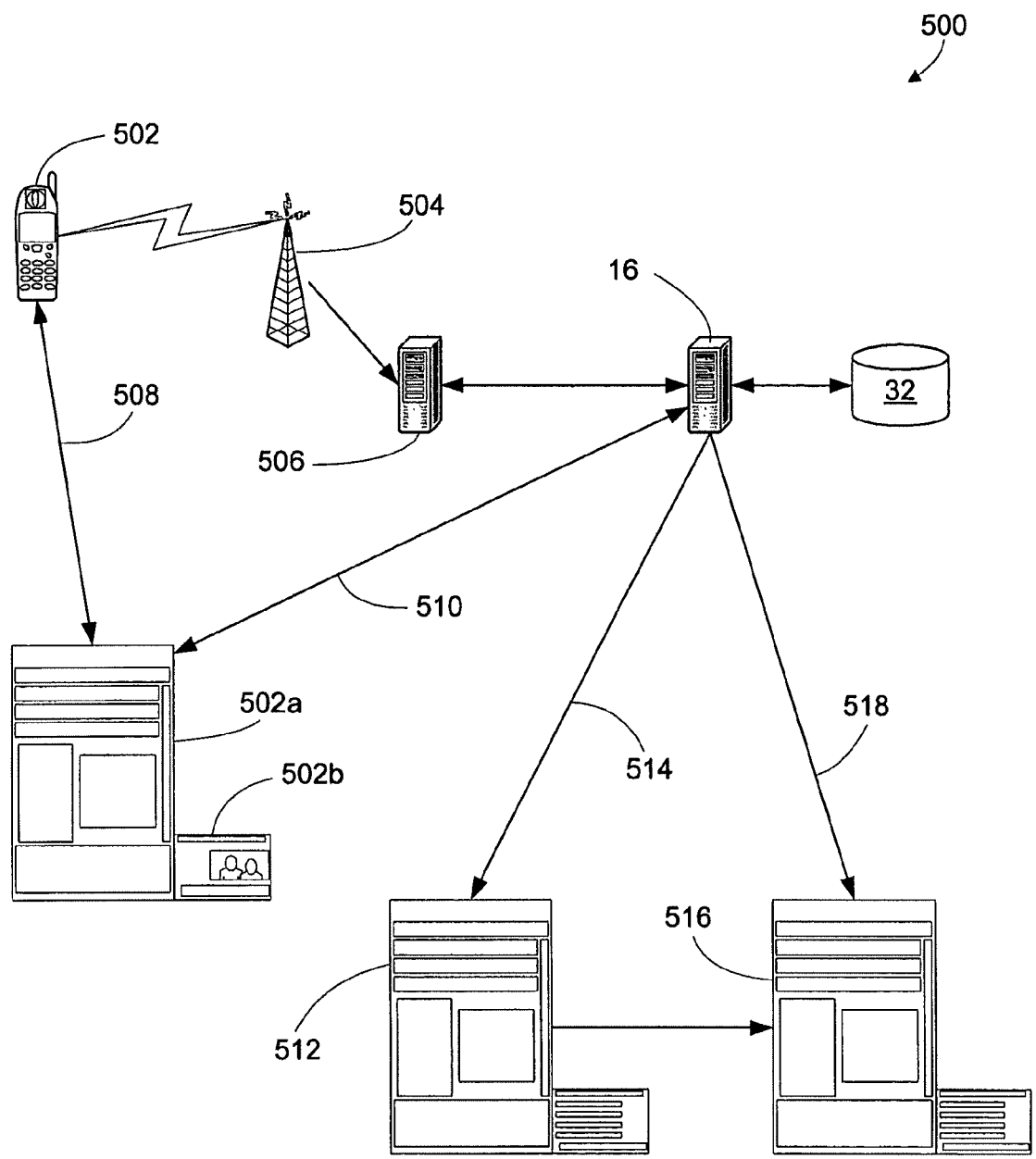
FIG. 10 shows a schematic representation of an exemplary system for peer-to-peer file sharing of pictures.

Referring now to FIG. 10, a schematic representation of an exemplary peer to peer system 500 for sharing pictures is illustrated. As is known in the art, wireless or cellular phones, such as phone 502, can include picture capabilities. A user of phone 502 can transfer a picture to base station 504, which can upload the picture to a mail server 506 for transfer to a designated user. With current systems, the picture can be forwarded by mail server 506 to the mail service client of the designated user (not shown). With use of system 500, web server 16 can continuously or periodically poll mail server 506 and can perform a picture profile dump to database 32 when phone 502 so designates. In this manner, phone 502 can have multiple pictures available for forwarding to other users.

Phone 502 can place a call to system 500, as indicated by arrows 508, 510, to obtain profiles of available pictures from server 16. For the exemplary system 500, phone 502 can include the p2p node functionality for displaying and choosing picture profiles as indicated at schematic display 502a of phone 502. For example, picture profiles can be displayed as pop-ups, or toasts 502b. When phone 502 designates another user, as at p2p node 512, to receive the picture, web server 16 can download the file to p2p node 512 in a p2p session 514, such as has been previously described herein.

Similarly, a user of wireless phone 502 can designate that the picture be downloaded to the user's home computer 516, where home computer 516 can operate as a p2p node. Again, web server 16 can download the file to home computer/p2p node 516 in a p2p session 518. When p2p nodes designated to receive a picture are not available for a p2p session, web server 16 can store the pictures, as previously described with relation to picture profiles. On login, a p2p node can check to see if pictures are available in the manner as described for phone 502 obtaining picture profiles, and can request a p2p session to download the pictures.

While the systems and implementations thereof have been disclosed in connection with certain embodiments shown and described in detail, various modifications and improvements thereon will become readily apparent to those skilled in the art. Those with ordinary skill in the art will recognize that the arrangement and connectivity of the components and activities shown in the figures are merely for illustrative purposes, and can be varied accordingly and components and activities may be combined or otherwise reconfigured without departing from the scope of the disclosed systems and methods. For example, it can be understood that component and data flow configurations of p2p agent 20, p2p web browser 18 and web server 16, other than that illustrated in FIGS. 9 and 10, can be contemplated so as to provide the functionality described herein.

The systems and methods described herein may not be limited to a particular hardware or software configuration; they may find applicability in many communication environments. The techniques may be implemented in hardware or software, or a combination thereof. The systems and methods can be implemented in one or more computer programs executing on one or more programmable computers, such as may be exemplified by the web server 16 and peer nodes 12a-12n of FIG. 1, among others, that include a processor, a storage medium readable by the processor (including volatile and non-volatile memory and/or storage elements), one or more input devices, and one or more output devices.

The computer programs, or programs, may be preferably implemented using one or more high level procedural or object-oriented programming languages to communicate with a computer system; however, the program(s) can be implemented in assembly or machine language, if desired. The language can be compiled or interpreted. The computer program(s) can be preferably stored on a storage medium or device (e.g., CD-ROM, hard disk, or magnetic disk) readable by a general or special purpose programmable computer for configuring and operating the computer when the storage medium or device is read by the computer to perform the procedures described herein. The system can also be considered to be implemented as a computer-readable storage medium, configured with a computer program, where the storage medium so configured causes a computer to operate in a specific and predefined manner.

While the method and systems have been disclosed in connection with the preferred embodiments shown and described in detail, various modifications and improvements thereon will become readily apparent to those skilled in the art. As an example, those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods. Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A system, comprising a network server including at least a processor that provides the following operations:
   interface a first network and a second network;
   send an invitation to establish a file sharing session with a selected invitee;
   receive, from the first network, a trigger event received in the first network from a non web-enabled device that communicates the trigger event to the first network, wherein the trigger event includes a designation of the selected invitee and at least one file to be transferred and wherein the trigger event is received after the file sharing session is established; and
   transmit a notification that includes the designation to the second network based on the trigger event, the second network being a web-enabled network communicatively coupled to at least a first web-enabled peer node that is capable of receiving the notification.

2. The system of claim 1, further comprising a plurality of web-enabled peer nodes including at least the first web-enabled peer node and a second web-enabled peer node, wherein the first web-enabled peer node initiates the file sharing session, and the second web-enabled peer node participates in the file sharing session with the first web-enabled peer node according to the notification.

3. The system of claim 1, wherein the file sharing session is established between at least the first web-enabled peer node and a second web-enabled peer node.

4. The system of claim 1, wherein the first web-enabled peer node:
breaks the designated at least one file into blocks;
attaches identification data to a first set of the blocks;
broadcasts the first of the blocks to at least the second web-enabled peer node;
awaits receipt of an acknowledgment from at least the second web-enabled peer node when one of the blocks is received by the at least one second web-enabled peer node; and
attaches identification to a subsequent block, broadcasting the subsequent block, and
awaits receipt of acknowledgment of the subsequent block.

5. The system of claim 1, wherein the first network is a Public Switched Telephone Network (PSTN), and the non-web-enabled device is a PSTN telephone.

6. The system of claim 1, the network server comprising a relay server, the operations further including:
receive a request for the designated file from the first web-enabled peer node in response to the notification;
relay the request to the second web-enabled peer node; and
transfer the designated file from the first web-enabled peer node to the second web-enabled peer node.

7. The system of claim 1, wherein the non web-enabled device is a wireless telephone.

8. A non-transitory computer readable medium having instructions that when executed by a processor cause the processor to:
send an invitation to establish a file sharing session with a selected invitee;
receive, from a first network, a trigger event received in the first network from a non web-enabled device configured to communicate the trigger event to the first network, wherein the trigger event includes a designation of at least one file to be transferred and wherein the trigger event is received after the file sharing session is established; and
transmit a notification that includes the designation to a second network based on the trigger event, the second network being a web-enabled network communicatively coupled to at least a first web-enabled peer node that is capable of receiving the notification.

9. The medium of claim 8, wherein the file sharing session is established between at least the first web-enabled peer node and a second web-enabled peer node, the first web-enabled peer node being further configured to initiate the file sharing session, and the second web-enabled peer node being configured to participate in the file sharing session with the first web-enabled peer node according to the notification.

10. The medium of claim 8, further causing the processor to:
break the designated at least one file into blocks;
attach identification data to a first set of the blocks;
broadcast the first of the blocks to at least the second web-enabled peer node;
await receipt of an acknowledgment from at least the second web-enabled peer node when one of the blocks is received by the at least one second web-enabled peer node; and
attach identification to a subsequent block, broadcasting the subsequent block, and awaiting receipt of acknowledgment of the subsequent block.

11. The medium of claim 8, wherein the first network is a Public Switched Telephone Network (PSTN), and the non-web-enabled device is a PSTN telephone.

12. The medium of claim 8, further causing the processor to:
receive a request for the designated file from the first web-enabled peer node in response to the notification;
relay the request to the second web-enabled peer node; and
transfer the designated file from the first web-enabled peer node to the second web-enabled peer node.

13. The medium of claim 8, wherein the non web-enabled device is a wireless telephone.

14. A method, comprising:
sending an invitation to establish a file sharing session with a selected invitee;
receiving, in a network server that includes at least a processor, from a first network, a trigger event received in the first network from a non web-enabled device configured to communicate the trigger event to the first network, wherein the trigger event includes a designation of at least one file to be transferred and wherein the trigger event is received after the file sharing session is established; and
transmitting, with the network server that includes at least the processor, a notification that includes the designation to a second network based on the trigger event, the second network being a web-enabled network communicatively coupled to at least a first web-enabled peer node that is capable of receiving the notification.

15. The method of claim 14, further comprising using the first web-enabled peer node for initiating another file sharing session with at least a second web-enabled peer node according to the notification.

16. The method of claim 14, wherein the file sharing session is established between at least the first web-enabled peer node and a second web-enabled peer node.

17. The method of claim 14, further comprising, in the first web-enabled peer node:
breaking the designated at least one file into blocks;
attaching identification data to a first set of the blocks;
broadcasting the first of the blocks to at least the second web-enabled peer node;
awaiting receipt of an acknowledgment from at least the second web-enabled peer node when one of the blocks is received by the at least one second web-enabled peer node; and
attaching identification to a subsequent block, broadcasting the subsequent block, and awaiting receipt of acknowledgment of the subsequent block.

18. The method of claim 14, wherein the first network is a Public Switched Telephone Network (PSTN); and the non-web-enabled device is a PSTN telephone.

19. The method of claim 14, further comprising:
receiving a request for the designated file from the first web-enabled peer node in response to the notification;
relaying the request to the second web-enabled peer node; and
transferring the designated file from the first web-enabled peer node to the second web-enabled peer node.

20. The system of claim 1, wherein the non web-enabled device is a wireless telephone.

* * * * *